(12) United States Patent
Zhang et al.

(10) Patent No.: US 9,955,154 B2
(45) Date of Patent: Apr. 24, 2018

(54) SYSTEMS, METHODS, AND COMPUTER PROGRAM PRODUCTS FOR SCALABLE VIDEO CODING BASED ON COEFFICIENT SAMPLING

(75) Inventors: Wenhao Zhang, Beijing (CN); Yi-Jen Chiu, San Jose, CA (US); Lidong Xu, Beijing (CN); Yu Han, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 13/995,182

(22) PCT Filed: Jun. 29, 2012

(86) PCT No.: PCT/CN2012/000890
§ 371 (c)(1),
(2), (4) Date: Oct. 10, 2013

(87) PCT Pub. No.: WO2014/000125
PCT Pub. Date: Jan. 3, 2014

(65) Prior Publication Data
US 2014/0140410 A1 May 22, 2014

(51) Int. Cl.
*H04N 19/30* (2014.01)

(52) U.S. Cl.
CPC ....... *H04N 19/00424* (2013.01); *H04N 19/30* (2014.11)

(58) Field of Classification Search
CPC .. H04N 19/00424; H04N 19/30; H04N 19/34; H04N 19/33; H04N 19/124
(Continued)

(56) References Cited

U.S. PATENT DOCUMENTS

| 5,253,055 A * | 10/1993 | Civanlar | H04N 21/236 348/415.1 |
| 6,134,269 A | 10/2000 | Puri et al. | |

(Continued)

FOREIGN PATENT DOCUMENTS

| CN | 1939066 A | 3/2007 |
| CN | 102065302 A | 5/2011 |

(Continued)

OTHER PUBLICATIONS

Li et al. "Overview of Fine Granularity Scalability in MPEG-4 Video Standard", IEEE Transactions on Circuits and Systems for Video Technology, vol. 11, No. 3, Mar. 2001, pp. 301-317.*

(Continued)

*Primary Examiner* — William C Vaughn, Jr.
*Assistant Examiner* — Naod Belai
(74) *Attorney, Agent, or Firm* — Green, Howard & Mughal LLP.

(57) ABSTRACT

Methods, systems, and computer program products for the generation of multiple layers of scaled encoded video data compatible with the HEVC standard. Residue from prediction processing may be transformed into coefficients in the frequency domain. The coefficients may then be sampled to create a layer of encoded data. The coefficients may be sampled in different ways to create multiple respective layers. The layers may then be multiplexed and sent to a decoder. There, one or more of the layers may be chosen. The choice of certain layer(s) may be dependent on the desired attributes of the resulting video. A certain level of video quality, frame rate, resolution, and/or bit depth may be desired, for example. The coefficients in the chosen layers may then be assembled to create a version of the residue to be used in video decoding.

16 Claims, 12 Drawing Sheets

(58) Field of Classification Search
USPC .................. 375/240.18, 240.21, 240.03, 240
See application file for complete search history.

(56) References Cited

U.S. PATENT DOCUMENTS

| | | | |
|---|---|---|---|
| 6,873,655 B2 | 3/2005 | Comer et al. | |
| 2004/0105586 A1* | 6/2004 | Bayazit | H04N 19/105 382/232 |
| 2007/0160133 A1* | 7/2007 | Bao | H04N 19/105 375/240.1 |
| 2009/0097561 A1 | 4/2009 | Chiu et al. | |
| 2009/0213926 A1 | 8/2009 | Shin et al. | |
| 2009/0274381 A1* | 11/2009 | Kirenko | H04N 19/61 382/236 |
| 2010/0020867 A1* | 1/2010 | Wiegand | H04N 19/34 375/240.02 |
| 2013/0188692 A1 | 7/2013 | Chiu et al. | |

FOREIGN PATENT DOCUMENTS

| | | |
|---|---|---|
| EP | 0986256 | 3/2000 |
| EP | 0986265 | 3/2000 |
| JP | 02-113748 | 4/1990 |
| JP | 60-098308 | 8/1994 |

OTHER PUBLICATIONS

"MPEG Digital Video-Coding Standards Delivering Picture-Perfect Compression for Storage, Transmission, and Multimedia Applications", IEEE Signal Processing Magazine, IEEE Service Center, Piscataway, NJ, US, vol. 14, No. 5, Sep. 1, 1997, pp. 82-100.
Extended European Search Report for EP Patent Application No. 12879814.7, dated Feb. 12, 2016.
Office Action for Japanese Patent Application No. 2015-511882, dated Nov. 10, 2015.
International Search Report and Written Opinion Received for PCT Application No. PCT/CN2012/000890, dated Nov. 8, 2012, 10 pages.
English Translation of Office Action for Japanese Patent Application No. 2015-511882, dated Jun. 7, 2016.
Translation of Office Action for Japanese Patent Application No. 2015-511882, dated Oct. 18, 2016.
Office Action for Chinese Patent Application No. 201280073513.4, dated Dec. 23, 2016. No Translation available.
Office Action for European Patent Application No. 12879814.7, dated Jan. 11, 2017.
Chiu, Y et al., "Non-CE11: Coefficient sub-sampling for large transform", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0249, Jan. 31, 2012, XP030111276.
English Translation of Second Office Action for Chinese Patent Application No. 201280073513.4 dated Jun. 14, 2017.

\* cited by examiner

SYSTEMS, METHODS, AND COMPUTER PROGRAM PRODUCTS FOR SCALABLE VIDEO CODING BASED ON COEFFICIENT SAMPLING

BACKGROUND

High Efficiency Video Coding (HEVC) is an evolving video compression standard. It is under development by the Joint Collaborative Team on Video Coding (JCT-VC) formed by ISO/IEC Moving Picture Experts Group (MPEG) and ITU-T Video Coding Experts Group (VCEG). HEVC can employ several modules such as intra/inter prediction, transform, quantization and in-loop filtering and entropy coding modules.

As the standardization of HEVC is reaching completion, JCT-VC has started planning to add a Scalable Video Coding (SVC) extension into the HEVC standard. SVC is a way of coping with the heterogeneity of networks and devices in modern video service environments. A SVC bit stream may contain several subset bit streams that can themselves be decoded, where these sub streams may each represent the source video content but with different respective resolutions, frame rates, quality, and/or bit depths, for example. On the decoding side, a particular subset stream may be chosen for decoding, where the choice may be based on a desired resolution, frame rate, quality, and/or bit depth, etc.

The scalability is achieved by using a multi-layer coding structure. In general, there may be one base layer (BL) and several enhancement layers (ELs) in a SVC system. The BL may be encoded in a manner that is compatible with the HEVC standard, and may be identified as layer 0. ELs may be identified as layers 1, 2, . . . etc. When coding an EL with layer identifier equal to N, all the layers with a layer identifier less than N are available. This means that the picture corresponding to an EL may be predicted from lower layer pictures (i.e., layers having a lesser number) or from previously coded pictures in the same layer. All the layers may be sent to the decoding side, where a particular layer may be chosen for decoding.

Because each layer represents the source video content, the transmission and storage of multiple layers represents a significant amount of data. While an end user is provided with several options as to which representation (i.e., layer) to decode, significant bandwidth and processing power may be consumed in the encoding, transmission, and storage of these layers.

BRIEF DESCRIPTION OF THE DRAWINGS/FIGURES

Figure 1:
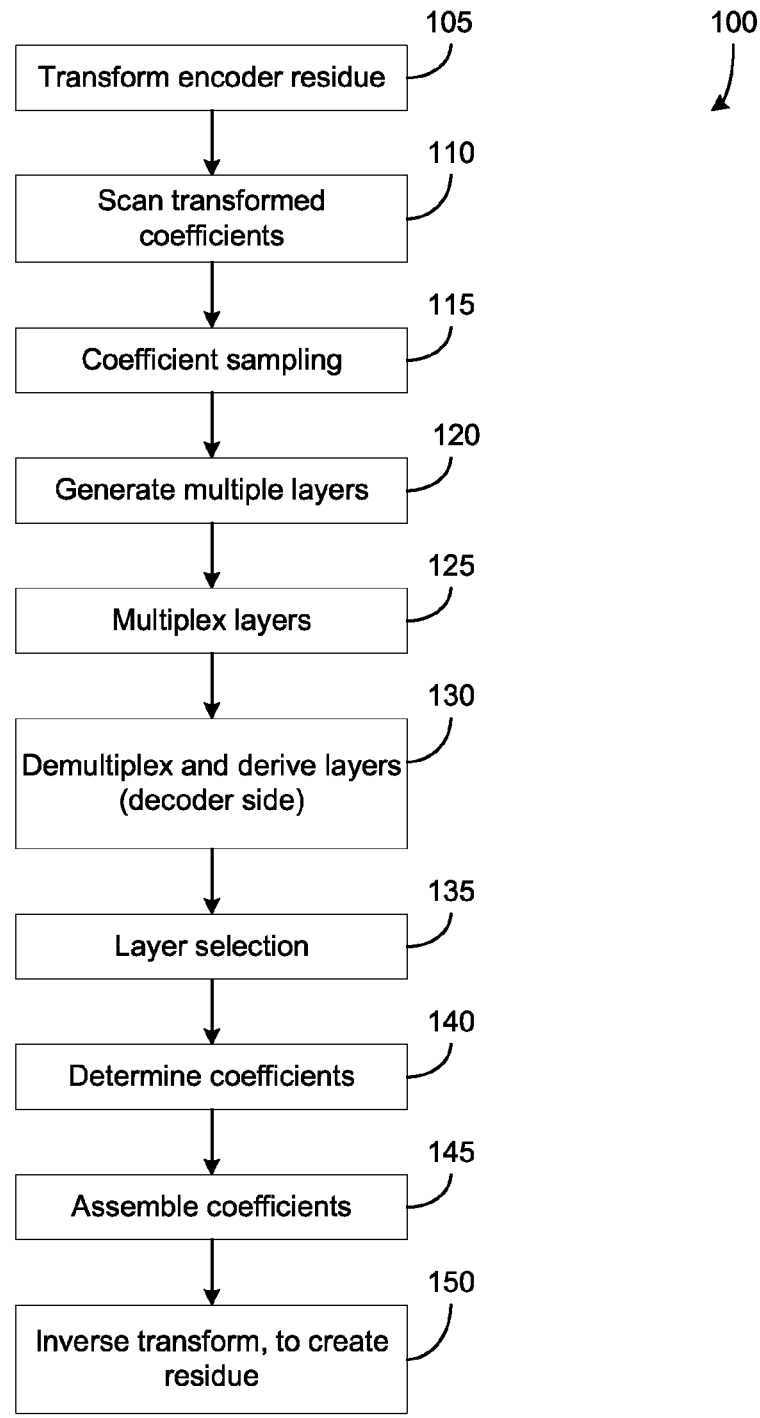
FIG. 1 is a flowchart illustrating processing of an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems, and computer program products for the generation of multiple layers of video data compatible with the HEVC standard. Residue from processing may be transformed into coefficients in a frequency domain. The coefficients may then be sampled to create a layer of video data. The coefficients may be sampled in different ways to create different respective layers. The layers may then be multiplexed and sent to a decoder. There, one or more of the layers may be chosen. The choice of certain layer(s) may be dependent on the desired attributes of the resulting video. A certain level of video quality, frame rate, resolution, and/or bit depth may be desired, for example. The coefficients in the chosen layers may then be assembled to create a version of the residue to be used in video decoding.

FIG. 1 illustrates the processing of scalable coded video, according to an embodiment. At 105, the residue from a predictive video compression process that executes during video compression may be transformed into coefficients in the frequency domain. At 110, the coefficients may be scanned into a one-dimensional form or data structure. At 115, the coefficients may be sampled. In an alternative embodiment, sampling may take place prior to scanning, as will be described in greater detail below. Multiple samplings may be performed, where each sampling results in a subset of the coefficients. In an embodiment, sampling may be performed on coefficients corresponding to the luma component, or on a chroma component of the video. At 120, multiple layers of encoded data may be generated, where one layer is generated for each sampling of the coefficients. The layers may be multiplexed at 125.

At 130, at a decoder, the multiplexed data may be demultiplexed so that the separate layers may be derived. At 135, a subset of the layers may be selected to meet the requirements of a user or user's video processing system. As noted above, the choice of a particular subset of layers may be dependent on such requirements, allowing for scalability. At 140, the coefficients from these selected layers may be determined, and at 145 the coefficients may be assembled. An inverse transform may then be performed on the resulting coefficients at 150. This may create a version of the original residue that may then be used to decode the video in an acceptable form.

Figure 2:
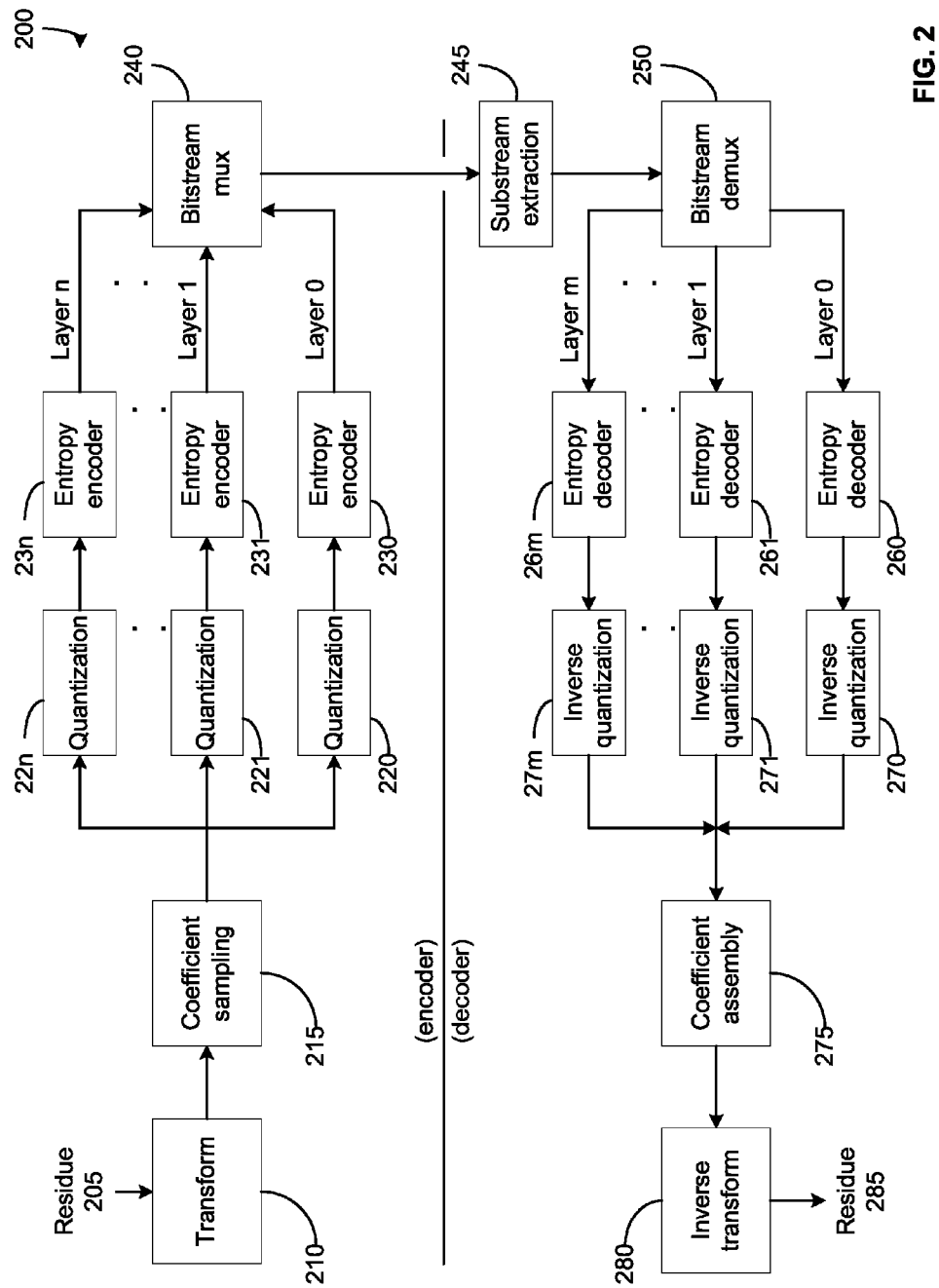
FIG. 2 is a block diagram of a system for scalable video encoding and decoding, according to an embodiment.

Systems for encoding and decoding video in a scalable manner are illustrated in FIG. 2, according to an embodiment. Residue 205 from a predictive video compression process may be received and input into a transformation module 210 in an encoder. This transformation may result in a representation of the residue 205 in the frequency domain, where the output of the transformation module 210 may be coefficients for that representation. The transform may be a square quad-tree transform, for example, or alternatively may be a non-square quad-tree transform. The coefficients may then be output to a coefficient sampling module 215. Here, the coefficients may be sampled multiple times, each time resulting in a different subset of the original coefficients.

Each subset, or respective sampling, is processed separately to generate its own layer of video data. For each layer, the coefficients may be passed to a quantization module. To create layer 0, the coefficients are passed to a quantization module 220, the output of which may be passed to an entropy encoder 230. The result of this entropy encoding may be layer 0. Another sampling may result in a subset of coefficients that may be sent to a quantization module 221, the output of which may be sent to entropy encoder 231. The output of entropy encoder 231 may be layer 1. This may be repeated for a number of samplings, resulting in a corresponding number of layers. The final is layer illustrated as layer n. The layers may then be combined by a bitstream multiplexer (mux) 240.

At a decoder, the multiplexed bitstream may be processed at a substream extraction module 245. Here a substream representing a selection from among the layers 0 . . . n is extracted. The demultiplexing of these selected layers may be performed at bitstream demultiplexer (demux) 250, resulting in the illustrated layers 0, 1, . . . m. In various embodiments, any subset of the original layers 0, . . . n may be selected and demultiplexed. Each layer may then undergo processing to recover the associated coefficients. Layer 0 may be processed by entropy encoder 260 and inverse quantization module 270. Each selected layer may be processed analogously. The coefficients may be aggregated at coefficient assembly module 275. An inverse transformation 280 may then be performed on the assembled coefficients. The result is a residue 285. Note that residue 285 may not be identical to residue 205; rather, residue 285 may be seen as an approximation of residue 205, given that not all of the original layers 0, . . . n may have been extracted by extraction module 245. Residue 285 may then be used in the final decoding of the encoded source video (not shown).

Figure 3:
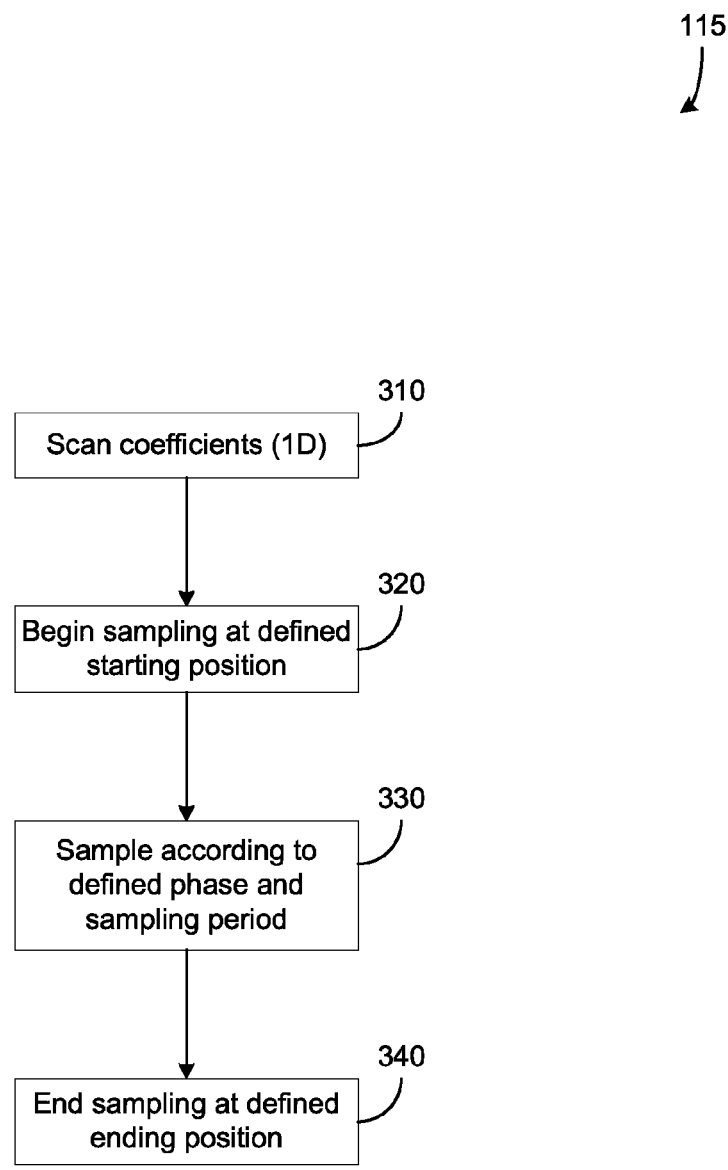
FIG. 3 is a flowchart illustrating coefficient sampling, according to an embodiment.

The process of coefficient sampling (115 of FIG. 1) is illustrated in FIG. 3, according to an embodiment. The coefficients that result from the transformation of the residue may be organized in two-dimensional form, as processed according to the HEVC standard. The coefficients may be scanned at 310, resulting in a one-dimensional organization of the coefficients. This scanning operation may use a horizontal scan order, a vertical scan order, or a diagonal scan order.

Once scanning is completed, sampling may take place. The sampling process may be controlled by several predefined sampling parameters. These may include a starting position and ending position for the sampling. In addition, a sampling pattern may be defined. The sampling pattern may include a sampling ratio or period R. This value represents the periodicity of the sampling process. If the original transform core is two-dimensional and has a size N×M, then the total number of coefficients is N×M, and R may be in the range of (1, (N×M)−1]. The sampling pattern may also include the definition of a phase, which specifies which coefficients in each period are sampled. Therefore, if the period R=4 and the phase is defined as (0, 1, 3), then the coefficients may be considered in consecutive non-overlapping groups of 4. In each group of 4, the coefficients may be identified as coefficients 0, 1, 2, and 3. If the phase is (0, 1, 3), then the coefficients numbered 0, 1, and 3 may be sampled, i.e., the first, second, and fourth coefficients.

In an embodiment, the sampling parameters may be adaptively determined on the basis of a quantization parameter (QP) value. Sampling parameters may also be generated at an encoder by using characteristics of a current picture and/or previously encoded pictures. Such parameters may be transmitted to the decoder for use during decoding. Alternatively, sampling parameters may be generated at the decoder by using characteristics of previously coded neighboring pictures. Sampling parameters may alternatively be dependent on the transform core used in the transformation process. Here, different sized transform cores may lead to the use of different sampling parameters; also, square quad-tree transform cores may use different sampling parameters than non-square quad-tree transform cores. Moreover, different channels (e.g., chroma and luma) may use different sampling parameters.

At 320, sampling may begin at the defined starting position. At 330, sampling may proceed according to the predefined period and phase. At 340, the sampling may halt at the predefined ending position.

In an embodiment, coefficient sampling may be applied adaptively, for a particular coding or prediction mode, and/or for a particular coding unit, prediction unit, or transform unit. Coefficient sampling may be mandatory for a prediction mode, for example.

Figure 4:
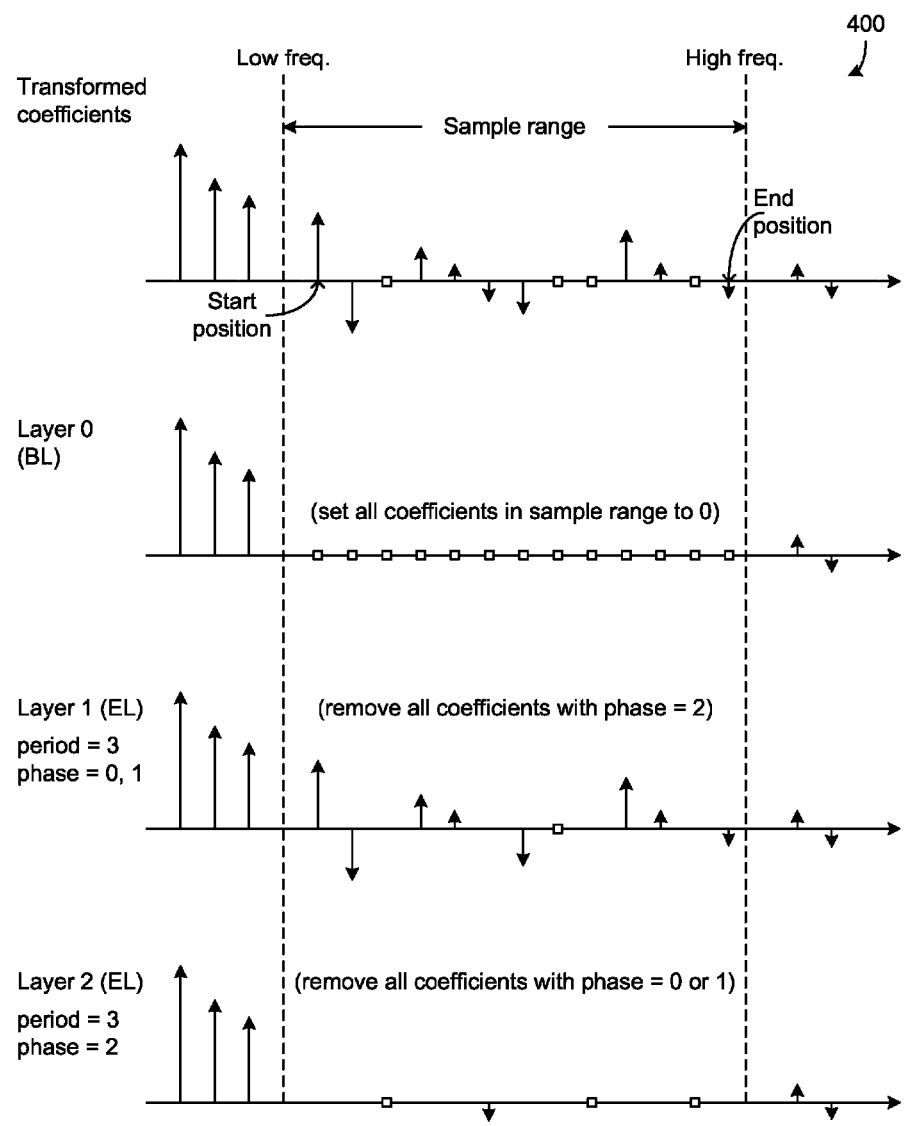
FIG. 4 is a graphical illustration of one-dimensional coefficient sampling, according to an embodiment.

An example sampling process is illustrated graphically in FIG. 4. In each of the four graphs shown, the Y axis represents coefficient value, while the X axis represents frequency. The height of each arrow represents the magnitude of the corresponding coefficient; a small hollow square on the X axis represents a coefficient having magnitude 0. The top graph represents the complete set of coefficients resulting from the transformation and scanning processes. The dashed lines represent to the extent of the sample range; within the sample range, start and end positions for the sampling process are defined as shown.

The second graph from the top shows layer 0, also known as the base layer (BL). Here, all the coefficients in the sample range are set to zero. The next graph shows a layer 1, which is an enhancement layer (EL). Here, the period is set to 3, and the phase is (0, 1). As a result, the coefficients in the sample range are considered in consecutive non-overlapping groups of 3. Within each group, the first and second coefficients are sampled, and the third coefficient is ignored.

The fourth graph (at the bottom of FIG. 4) shows layer 2, which is another EL. Here, the period is set to 3, and the phase is (2). As a result, the coefficients in the sample range are again considered in consecutive non-overlapping groups of 3. Within each group, the first and second coefficients are ignored, and the third coefficient is sampled. The indicated coefficients represent the resulting layer 2. As indicated, the first and the second coefficients in each group of 3 are removed, i.e., the coefficients corresponding to a phase of 0 or 1.

Figure 5:
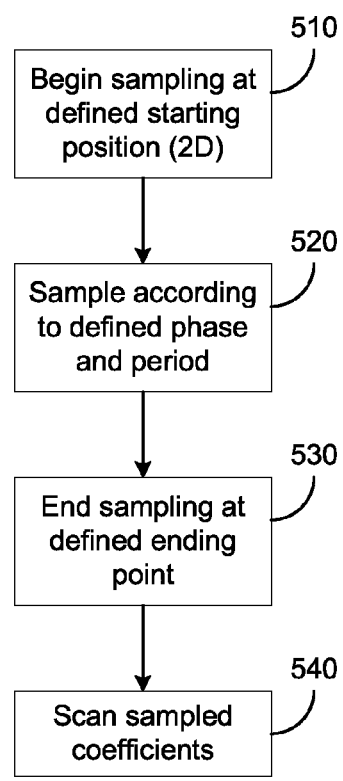
FIG. 5 is a flowchart illustrating an alternative process for coefficient sampling, according to an embodiment.

In an alternative embodiment, scanning may be performed after sampling. Here, the sampling may take place with respect to coefficients that are organized in two-dimensional form output from the transformation process. Such an embodiment is illustrated in FIG. 5. At 510, sampling may begin at the defined starting position in the two-dimensional (2D) array of coefficients. At 520, sampling may proceed according to the predefined phase and period. At 530, sampling may end at the predefined ending point. At 540, scanning may be performed on the sampled coefficients.

Figure 6:
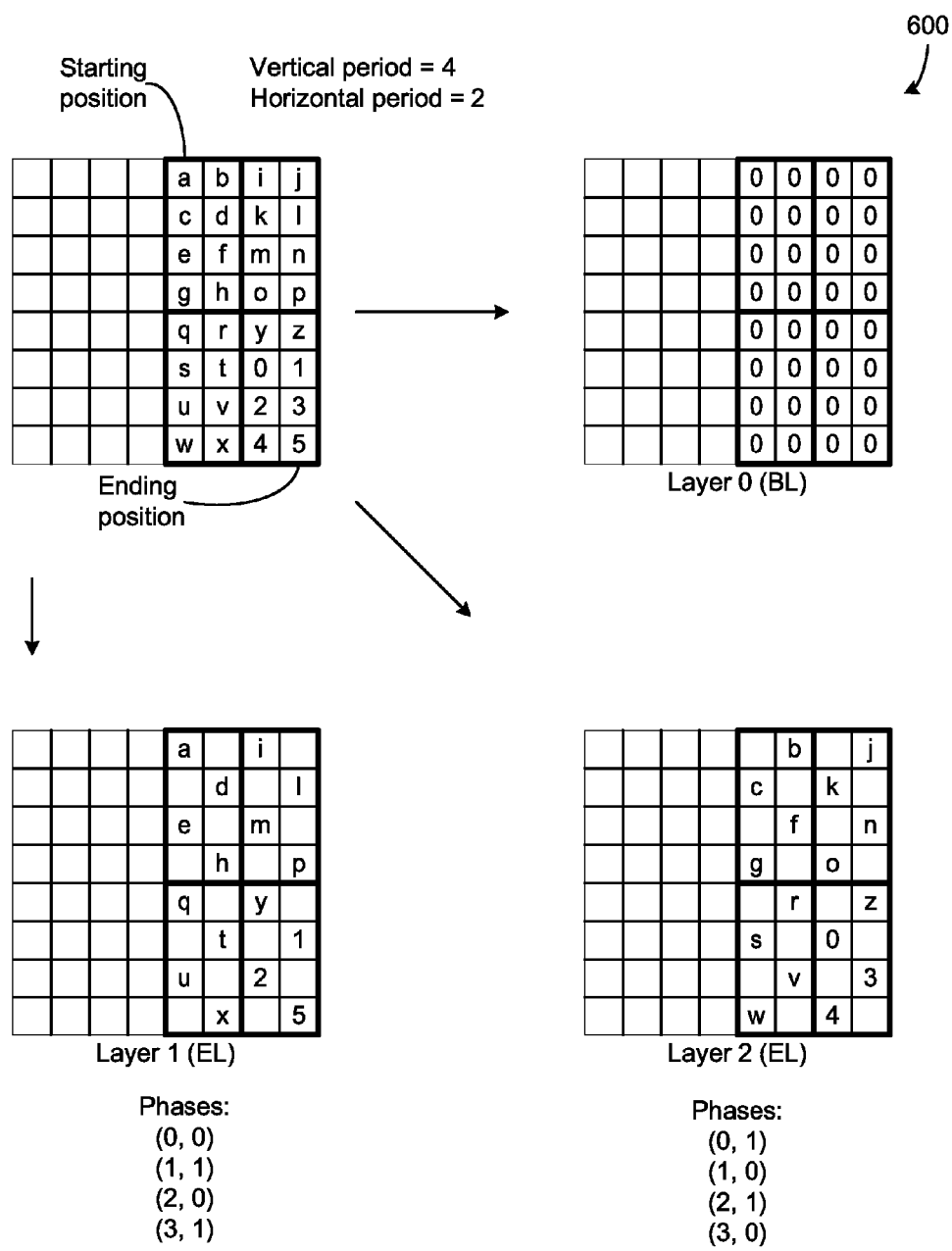
FIG. 6 is a graphical illustration of two-dimensional coefficient sampling, according to an embodiment.

Such an embodiment is illustrated graphically in FIG. 6. The upper left array may represent the coefficients as output by the transformation process. The right half of this array represents the sample range. The values of the coefficients are shown symbolically as a, . . . z, 0, 1, . . . 5. For sampling purposes, the predefined starting and ending positions are indicated. Also, the vertical period is set to 4 and the horizontal period is set to 2, as shown. The upper right array represents the BL, layer 0, in which all the coefficient values in the sample range are set to 0.

The lower left array represents an EL, layer 1. The phases for sampling are indicated as (0, 0) (which coincides with the starting point), (1, 1), (2, 0), and (3, 1). The coefficient sampled at position (0, 0) has the value a; the coefficient sampled at position (1, 1) has the value d; the coefficient sampled at position (2, 0) has the value e; and the coefficient sampled at position (3, 1) has the value h. Within each period, the above phases are continued, as shown. The lower right array represents another EL, layer 2. Here, a different sampling is performed. In particular, the phases are defined differently. The phases in this layer are (0, 1), (1, 0), (2, 1), and (3, 0). The sampled coefficients are as shown.

After sampling has been completed in such an embodiment, scanning of the sampled coefficients may take place. As before, scanning may proceed horizontally, vertically, or diagonally. The result may be a one-dimensional organization of these scanned coefficients.

Figure 7:
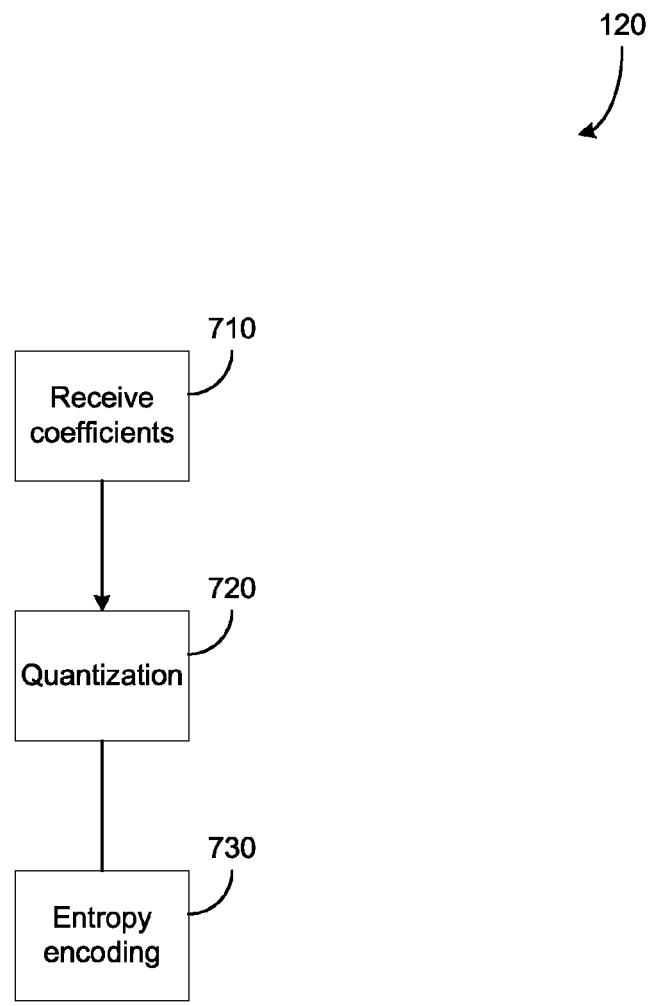
FIG. 7 is a flowchart illustrating layer generation, according to an embodiment.

Layer generation (120 of FIG. 1) is illustrated in FIG. 7, according to an embodiment. At 710, the coefficients of the layer may be received. At 720, quantization of the coefficients may be performed. At 730, entropy encoding may be performed. The output of the entropy encoding may represent a layer of video data.

Figure 8:
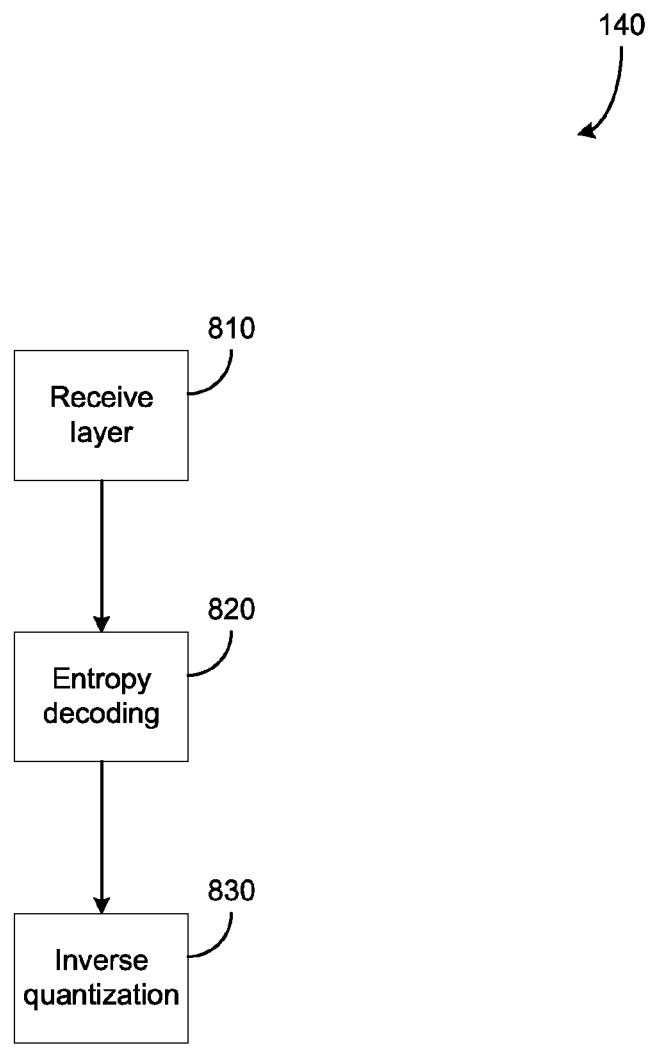
FIG. 8 is a flowchart illustrating the recovery of coefficients from received layers, according to an embodiment.

The inverse operation of deriving coefficients from such encoded data (140 of FIG. 1) is illustrated in FIG. 8, according to an embodiment. At 810, a selected layer may be received. At 820, entropy decoding may be performed. At 830, inverse quantization may be performed, resulting in the coefficients of the selected layer.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term software, as used herein, may refer to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory, read-only memory, or other data storage device.

Figure 9:
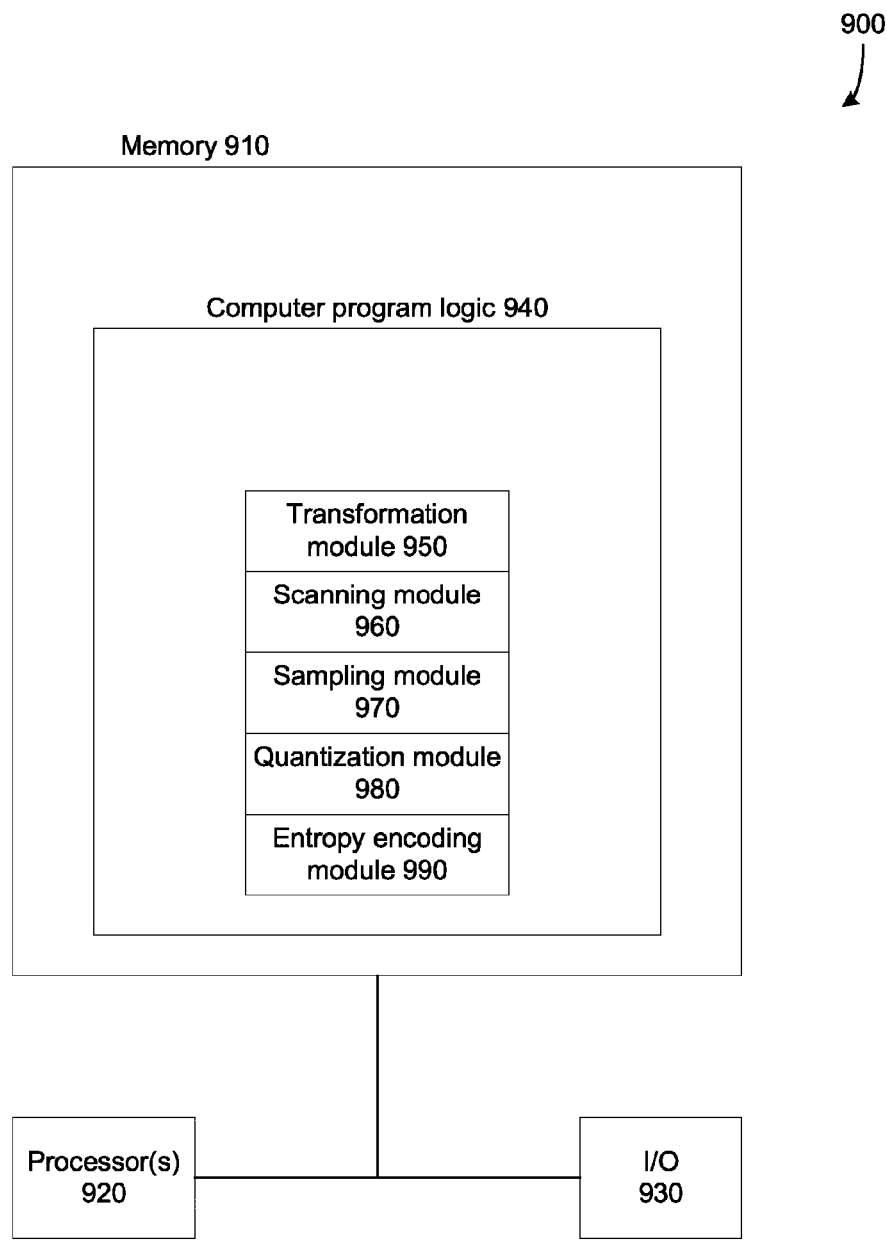
FIG. 9 is a block diagram of a computing environment for a software or firmware embodiment of scalable video encoding, according to an embodiment.

A computing system that executes such software/firmware is shown in FIG. 9, according to an embodiment. The illustrated system 900 may be used as part of or in support of a video encoder. System 900 may include one or more processor(s) 920 and may further include a body of memory 910. Processor(s) 920 may include one or more central processing unit cores and/or a graphics processing unit having one or more GPU cores. Memory 910 may include one or more computer readable media that may store computer program logic 940. Memory 910 may be implemented as a hard disk and drive, a removable media such as a compact disk, a read-only memory (ROM) or random access memory (RAM) device, for example, or some combination thereof. Processor(s) 920 and memory 910 may be in communication using any of several technologies known to one of ordinary skill in the art, such as a bus. Computer program logic 940 contained in memory 910 may be read and executed by processor(s) 920. One or more I/O ports and/or I/O devices, shown collectively as I/O 930, may also be connected to processor(s) 920 and memory 910.

Computer program logic 940 may include logic that embodies the processing described above with respect to creation of layers of video data. In the illustrated embodiment, computer program logic 940 may include a transformation module 950, which may be responsible for transforming residue into a set of coefficients in the frequency domain. Logic 940 may also include a scanning module 960, which may be responsible for converting coefficients in a two-dimensional form into a one-dimensional form. Logic 940 may also include a sampling module 970. This module may be responsible for a sampling of coefficients as described above, according to a predefined sampling pattern and given specified ending and starting positions. Logic 940 may also include a quantization module 980, responsible for quantizing coefficients in order to facilitate subsequent processing. Logic 940 may also include a module 990 for entropy encoding.

Figure 10:
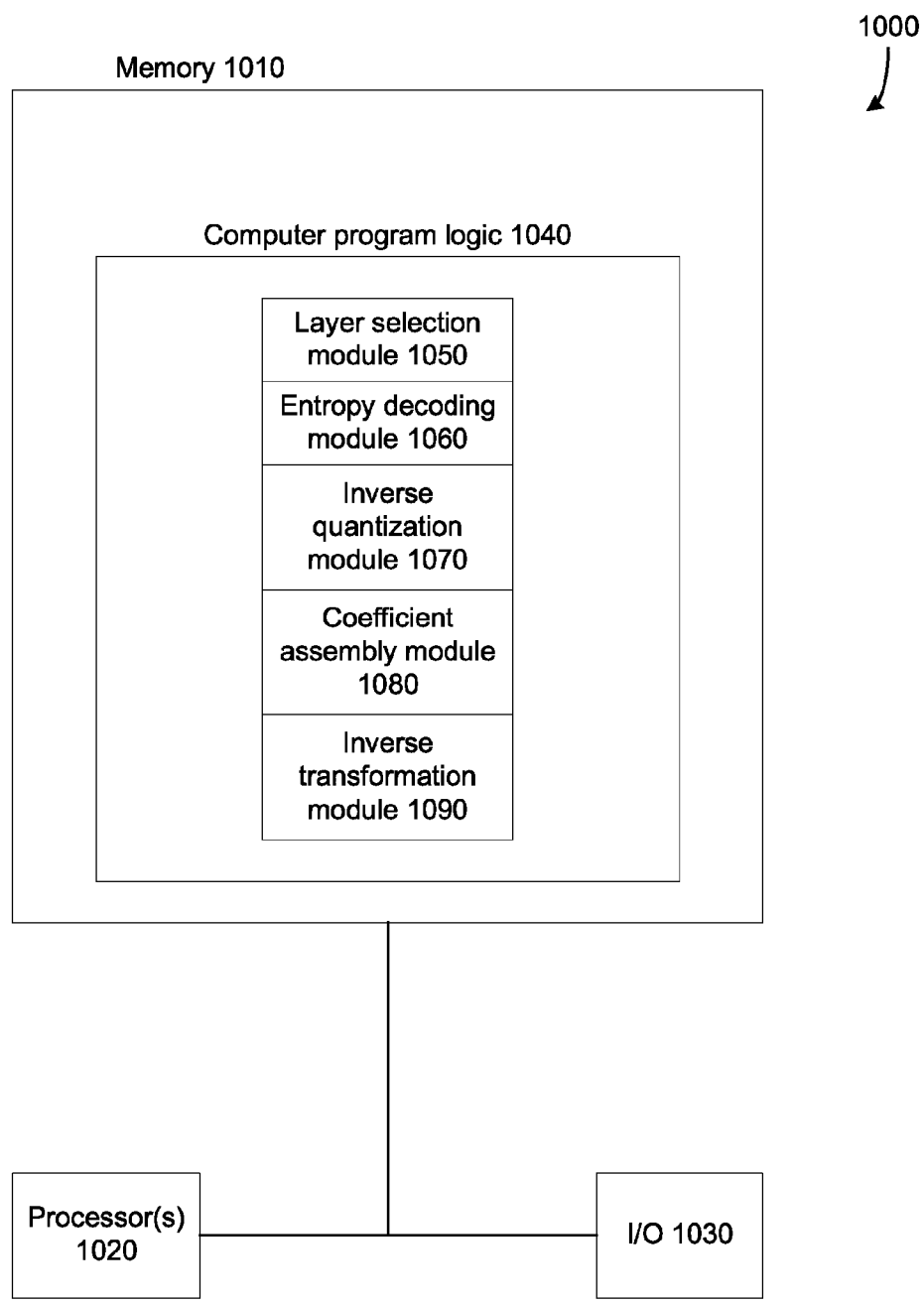
FIG. 10 is a block diagram of a computing environment for a software or firmware embodiment of scalable video decoding, according to an embodiment.

A computing system that executes software/firmware in a decoding system (or in support of such a decoding system) is shown in FIG. 10, according to an embodiment. The illustrated system 1000 may be used as part of or in support of a decoder. System 1000 may include one or more processor(s) 1020 and may further include a body of memory 1010. Processor(s) 1020 may include one or more central processing unit cores and/or a graphics processing unit having one or more GPU cores. Memory 1010 may include one or more computer readable media that may store computer program logic 1040. Memory 1010 may be implemented as a hard disk and drive, a removable media such as a compact disk, a read-only memory (ROM) or random access memory (RAM) device, for example, or some combination thereof. Processor(s) 1020 and memory 1010 may be in communication using any of several technologies known to one of ordinary skill in the art, such as a bus. Computer program logic 1040 contained in memory 1010 may be read and executed by processor(s) 1020. One or more I/O ports and/or I/O devices, shown collectively as I/O 1030, may also be connected to processor(s) 1020 and memory 1010.

Computer program logic 1040 may include logic that embodies the processing described above with respect to processing at a decoder. In the illustrated embodiment, computer program logic 1040 may include a layer selection module 1050, which may be responsible for selection of particular layers for decoding purposes. Computer program logic 1040 may also include a module 1060 responsible for entropy decoding. Computer program logic 1040 may also include an inverse quantization module 1070, which may be responsible for adapting quantized coefficients into a form that allows further processing. Logic 1040 may also include a coefficient assembly module 1080 that may be responsible for aggregating the coefficients from the selected layers. Logic 1040 may also include an inverse transform module 1090, which may be responsible for converting the coefficients into a form of the residue that may be used in decompression.

Figure 11:
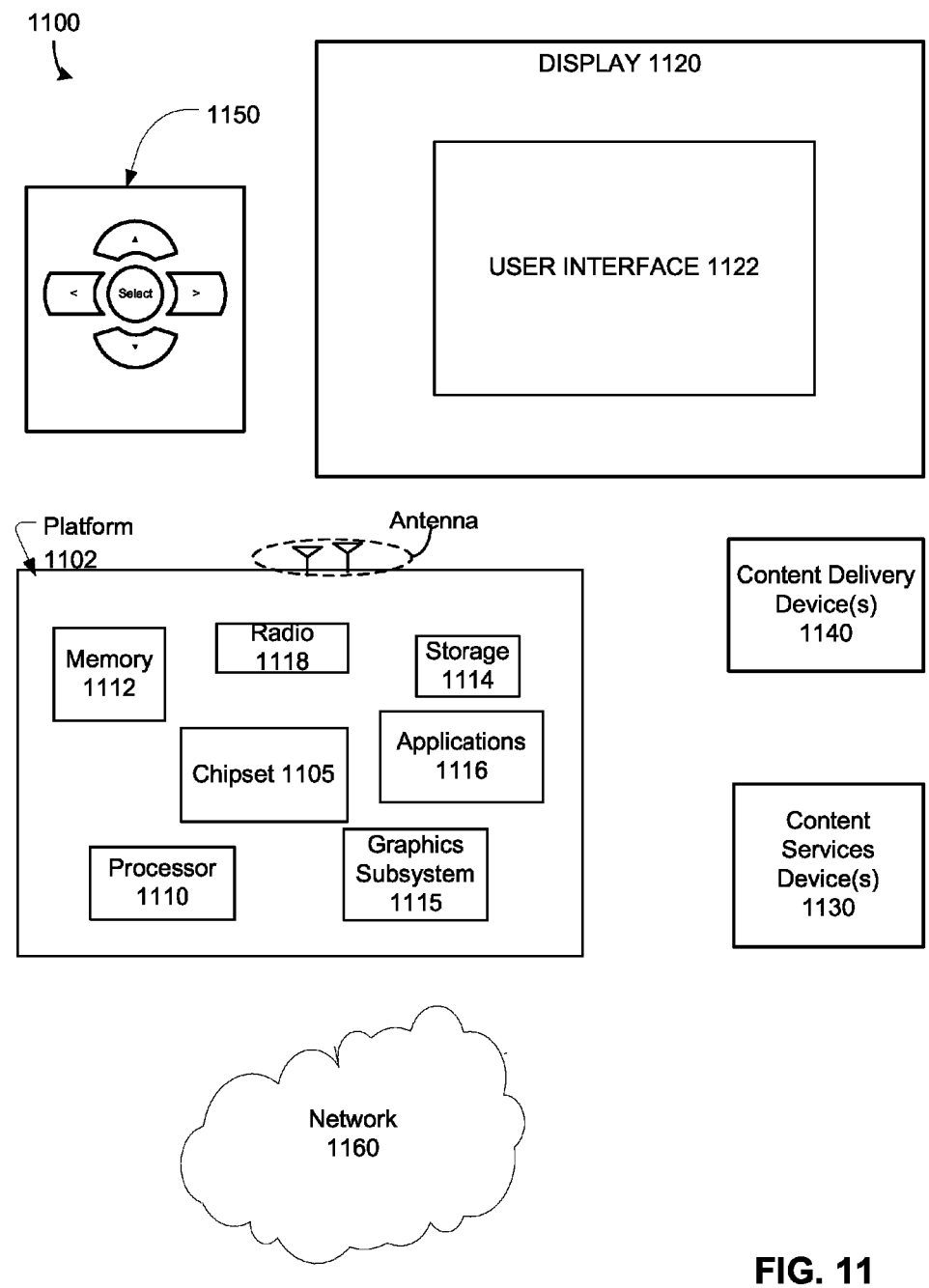
FIG. 11 is a block diagram illustrating a platform in which the functionality described herein may be implemented, according to an embodiment.

A system for scalable video coding and/or decoding, such as the systems illustrated in FIGS. 2, 9, and 10, may be a part of a larger information system. FIG. 11 illustrates such an embodiment. In embodiments, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1100 comprises a platform 1102 coupled to a display 1120. Platform 1102 may receive content from a content device such as content services device(s) 1130 or content delivery device(s) 1140 or other similar content sources. A navigation controller 1150 comprising one or more navigation features may be used to interact with, for example, platform 1102 and/or display 1120. Each of these components is described in more detail below.

In embodiments, platform 1102 may comprise any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1110 may comprise multi-core processor(s), multi-core mobile processor(s), and so forth. In an embodiment, processor 1110 may correspond to processor(s) 920 and/or 1020 of FIGS. 9 and 10 respectively.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1114 may comprise technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 could be integrated into processor 1110 or chipset 1105. Graphics subsystem 1115 could be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1118 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In embodiments, display 1120 may comprise any monitor or display. Display 1120 may comprise, for example, a computer display screen, touch screen display, video monitor, television-like device, and/or a television. Display 1120 may be digital and/or analog. In embodiments, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In embodiments, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In embodiments, content services device(s) 1130 may comprise a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 receives content such as cable television programming including media information, digital information, and/or other content. Examples of content providers may include any cable or satellite television or radio or Internet content providers. The provided examples are not meant to limit embodiments of the invention.

In embodiments, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be echoed on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but integrated into platform 1102 and/or display 1120. Embodiments, however, are not limited to the elements or in the context shown or described herein.

In embodiments, drivers (not shown) may comprise technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 when the platform is turned "off." In addition, chip set 1105 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the invention.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
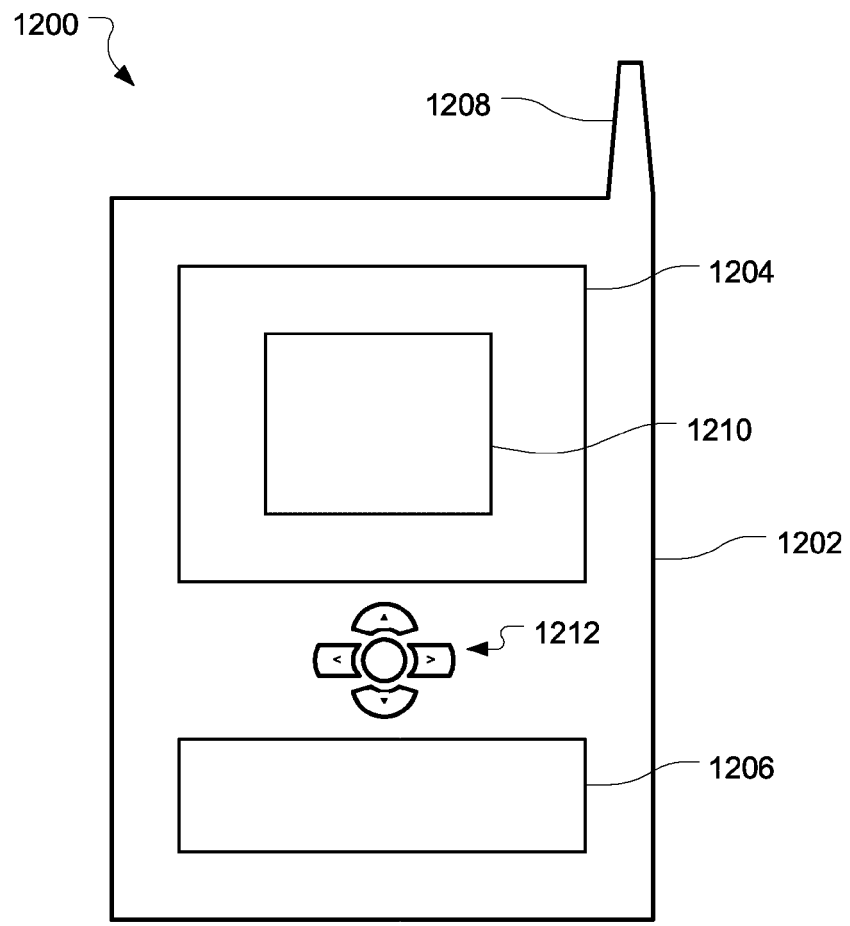
FIG. 12 is a diagram of an exemplary device in which the functionality described herein may be implemented, according to an embodiment.

As described above, system 1100 may be embodied in varying physical styles or form factors. FIG. 12 illustrates embodiments of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may comprise a housing 1202, a display 1204, an input/output (I/O) device 1206, and an antenna 1208. Device 1200 also may comprise navigation features 1212. Display 1204 may comprise any suitable display unit for displaying information appropriate for a mobile computing device. I/O device 1206 may comprise any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone. Such information may be digitized by a voice recognition device. The embodiments are not limited in this context.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

In an embodiment, a method of scalable video encoding may comprise sampling coefficients that result from a transformation of prediction residue of a process, wherein the sampling is performed a plurality of times to yield a respective plurality of samples; with each sample, generating a respective layer of encoded data; and multiplexing the respective layers.

In an embodiment, such a method may further comprise scanning each sample into a one-dimensional form, performed after said sampling and therefore said generation. In an alternative embodiment, such a method may further comprise scanning the coefficients that result from the transformation, into a one-dimensional form, performed before said sampling.

The generation of a layer of encoded data may comprise quantization of a sample; and entropy encoding a quantized sample. The sampling may be performed in accordance with the predefined sampling pattern, start position, and ending position.

In an embodiment, a method of scalable video decoding may comprise receiving a multiplexed bitstream comprising a plurality of layers of encoded data; selecting from the multiplexed bitstream a subset of the plurality of layers; for each layer in the subset, deriving a sample of coefficients that represent, at least in part, residue of a process; assembling the coefficients of the layers; and performing an inverse transform on the coefficients, to create a version of the residue. Such a method may further comprise determining a level of video quality, wherein the subset of the plurality of layers is selected to achieve the video quality. The deriving of the sample of coefficients for a layer may comprise entropy decoding the layer; and performing inverse quantization of the entropy decoded layer.

The processing described above may be implemented by an apparatus for scalable video encoding, comprising means for causing a processor to sample coefficients that result from a transformation of prediction residue of a process, wherein the sampling is performed a plurality of times to yield a respective plurality of samples;

means for causing the processor to, with each sample, generate a respective layer of encoded data; and means for causing the processor to multiplex the respective layers. Such an apparatus may further comprise means for causing the processor to scan each sample into a one-dimensional form, performed after said sampling and before said generation, or may comprise means for causing the processor to scan the coefficients that result from the transformation, into a one-dimensional form, performed before said sampling.

The means for causing the processor to generate a layer of encoded data may comprise means for causing the processor to quantize a sample; and means for causing the processor to entropy encode the quantized sample.

The sampling may be performed in accordance with a predefined sampling pattern, start position, and ending position.

An apparatus for scalable video decoding may comprise means for causing a processor to receive a multiplexed bitstream comprising a plurality of layers of encoded data; means for causing the processor to select from the multiplexed bitstream a subset of the plurality of layers; means for causing the processor to derive, for each layer in the subset, a sample of coefficients that represent, at least in part, residue of a process; means for causing the processor to assemble the coefficients of the layers; and means for causing the processor to perform an inverse transform on the coefficients, to create a version of the residue. The means for causing the processor to derive the sample of coefficients for a layer may comprise means for causing the processor to entropy decode the layer; and means for causing the processor to perform inverse quantization of the entropy decoded layer. Such an apparatus may also comprise means for causing the processor to determine a level of video quality, wherein the subset of the plurality of layers is selected to achieve a particular video quality.

An apparatus for scalable video encoding may comprise a coefficient sampling module for sampling coefficients that result from a transformation of prediction residue of a process, wherein the sampling is performed a plurality of times to yield a respective plurality of samples; means for generating, with each sample, a respective layer of encoded data; and a multiplexer for multiplexing the respective layers.

Such an apparatus may also comprise means for scanning each sample into a one-dimensional form, performed after said sampling and therefore said generation, or may comprise means for scanning the coefficients that result from the transformation, into a one-dimensional form, performed before said sampling.

The generating means may comprise a quantization module for quantization of a sample; and an entropy encoder for entropy encoding the quantized sample.

In such an apparatus, the sampling may be performed in accordance with the predefined sampling pattern, start position, and ending position.

An apparatus for scalable video decoding may comprise means for receiving a multiplexed bitstream comprising a plurality of layers of encoded data; a substream selection module for selecting from the multiplexed bitstream a subset of the plurality of layers; means for deriving, for each layer in the subset, a sample of coefficients that represent, at least in part, residue of a process; a coefficient assembly module for assembling the coefficients of the layers; and an inverse transformation module for performing an inverse transform on the coefficients, to create a version of the residue. The means for deriving the sample of coefficients for a layer may comprise an entropy encoder for entropy decoding the layer; and an inverse quantization module for performing inverse quantization of the entropy decoded layer. This apparatus may also comprise means for determining a level of video quality, wherein the subset of the plurality of layers is selected to achieve the video quality.

What is claimed is:

1. A method of scalable video coding (SVC), comprising:
receiving a residue from a predictive video compression process;
generating a two-dimensional (2D) coefficient array by performing a frequency transformation of the residue, the coefficient array comprising a plurality of consecutive, non-overlapping, groups of coefficients;
generating two or more sampled coefficient groups from a first portion of the coefficient array within a sample range, wherein:
a first sampled coefficient group includes one or more first coefficients located at one or more first coefficient positions within each consecutive group of coefficients within the first portion of the coefficient array that satisfy a first sampling pattern associated with a predefined sampling period and a predefined sampling phase that specifies the coefficient positions sampled within one sampling period, and excludes second coefficients that are within the first portion but fail to satisfy the first sampling pattern; and
a second sampled coefficient group includes one or more of the second coefficients located at one or more second coefficient positions within each consecutive group of coefficients that satisfy a second sampling pattern associated with the sampling period, and a different sampling phase, and excludes at least the first coefficients;
generating an unsampled coefficient group from a second portion of the coefficient array associated with frequencies below those corresponding to the sample range;
generating three or more layers of scalable video data by separately quantizing and entropy encoding the unsampled coefficient group as a base layer (BL), the first sampled coefficient group as a first enhancement layer (EL), and the second sampled coefficient group as a second EL, wherein:
the unsampled coefficient group is quantized with an associated BL quantization parameter (QP) value;
the first sampled coefficient group is quantized with an associated first EL QP value; and
the second sampled coefficient group is quantized with an associated second EL QP value; and
multiplexing the layers of scalable video data into a bit stream.

2. The method of claim 1, wherein:
the first and second sampling patterns divide the first portion of the coefficient array into groups of four coefficients; and
the first and second sampling patterns each include one or more coefficient from each group of four coefficients.

3. The method of claim 2, wherein the first coefficients include two coefficients from each group of four coefficients, and the second coefficients include two coefficients from each group of four coefficient.

4. The method of claim 2, wherein generating the sampled coefficient groups and unsampled coefficient group further comprises:
assigning the first coefficients to the first coefficient group and assigning the second coefficients to the second coefficient group beginning with a starting position within the 2D coefficient array, wherein, beginning with the starting position, the first and second sampling patterns separate the 2D coefficient array according to a vertical sampling period and a horizontal sampling period, and the first and second sampling patterns sample different coefficient positions within each vertical and horizontal sampling period;
scanning the unsampled coefficient group into a first one-dimensional (ID) coefficient series;
scanning the first sampled coefficient group into a second 1D coefficient series; and
scanning the second sampled coefficient group into a third 1D coefficient series.

5. The method of claim 2, further comprising adaptively determining the first and second sampling patterns on the basis of a QP value employed in the quantization.

6. The method of claim 2, further comprising adaptively determining the first and second sampling patterns on the basis of the size of a transform core associated with the 2D coefficient array.

7. The method of claim 2, further comprising adaptively determining the first and second sampling patterns on the basis of the coding or prediction mode.

8. The method of claim 1, wherein generating the sampled coefficient groups and unsampled coefficient group further comprises:
scanning the coefficient array into a one-dimensional (1D) coefficient series; and
assigning the first coefficients to the first coefficient group and assigning the second coefficients to the second coefficient group beginning with a starting position that follows the unsampled coefficients in the series, wherein, beginning with the starting position, the first and second sampling patterns separate the 1D coefficient series into consecutive, non-overlapping groups, and the first and second sampling patterns sample different coefficient positions from each consecutive group of coefficients until reaching a predefined ending point.

9. The method of claim 8, wherein:
the first and second sampling patterns separate the ID coefficient series into consecutive, non-overlapping groups of three;
the first sample pattern samples two coefficients from the group of three; and the second sampling pattern samples one coefficient from the group of three.

10. A method of scalable video coding (SVC), comprising:
receiving a multiplexed bitstream comprising base layer (BL) video data and enhancement layer (EL) video data;
deriving from first EL video data a first sampled coefficient group that includes first coefficients within a first portion of a coefficient array that is within a sample range and satisfies a first sampling pattern associated with a predefined sampling period and a predefined sampling phase that specifies the coefficient positions sampled within one sampling period, and excludes second coefficients that are within the first portion, but fail to satisfy the first sampling pattern;
deriving from second EL video data a second sampled coefficient group that includes at least the second coefficients that satisfy a second sampling pattern associated with the sampling period, and a different sampling phase, and excludes the first coefficients;
deriving from the BL video data an unsampled coefficient group associated with frequencies below those corresponding to the sample range;
assembling the first sampled coefficient group, second sampled coefficient group and the unsampled coefficients into a two-dimensional (2D) coefficient array that represents, at least in part, residue of an SVC compression process, wherein the coefficient array comprises a plurality of consecutive, non-overlapping, groups of coefficients, one or more coefficients located at one or more first coefficient positions within each consecutive group of coefficients are assembled from the first coefficient group, and one or more coefficients located at one or more second coefficient positions within each consecutive group of coefficients are assembled from the second coefficient group; and
performing an inverse transform on the 2D coefficient array, to create a version of the residue.

11. A scalable video encoder, comprising:
an electronic memory to store a residue from a predictive video compression process; and
one or more microprocessor communicatively coupled to the memory, the one or more microprocessor to:
receive the residue from the memory;
generate a two-dimensional (2D) coefficient array by performing a frequency transformation of the residue, the coefficient array comprising a plurality of consecutive, non-overlapping, groups of coefficients;
generate two or more sampled coefficient groups from a first portion of the coefficient array within a sample range, wherein:
a first sampled coefficient group includes one or more first coefficients located at one or more first coefficient positions within each consecutive group of coefficients within the first portion of the coefficient array that satisfy a first sampling pattern associated with a predefined sampling period, and a predefined sampling phase that specifies the coefficient positions sampled within one sampling period, and excludes second coefficients that are within the first portion but fail to satisfy the first sampling pattern; and
a second sampled coefficient group includes one or more of the second coefficients located at one or more second coefficient positions within each consecutive group of coefficients that satisfy a second sampling pattern associated with the sampling period, and a different sampling phase, and excludes at least the first coefficients;
generate an unsampled coefficient group from a second portion of the coefficient array associated with frequencies below those corresponding to the sample range;
generate three or more layers of scalable video data by separately quantizing and entropy encoding the unsampled coefficient group as a base layer (BL), the first sampled coefficient group as a first enhancement layer (EL), and the second sampled coefficient group as a second EL, wherein:
the unsampled coefficient group is quantized with an associated BL quantization parameter (QP) value;
the first sampled coefficient group is quantized with an associated first EL QP value; and
the second sampled coefficient group is quantized with an associated second EL QP value; and
multiplex the video data layers into a bit stream.

12. The encoder of claim 11, wherein:
the first and second sampling patterns divide the first portion of the coefficient array into groups of four coefficients; and
the first and second sampling patterns each include one or more coefficient from each group of four coefficients.

13. The encoder of claim 12, wherein the first coefficients include two coefficients from each group of four coefficients, and the second coefficients include two coefficients from each group of four coefficient.

14. The encoder of claim 11, wherein the microprocessor is to:
scan the coefficient array into a one-dimensional (1D) coefficient series; and
assign the first coefficients to the first coefficient group and assign the second coefficients to the second coefficient group beginning with a starting position that follows the unsampled coefficients in the series; wherein, beginning with the starting position, the first and second sampling patterns separate the 1D coefficient series into consecutive, non-overlapping groups, and the first and second sampling patterns sample different coefficient positions from each consecutive group of coefficients until reaching a predefined ending point.

15. The encoder of claim 11, wherein the microprocessor is to:
assign the first coefficients to the first coefficient group and assign the second coefficients to the second coefficient group beginning with a starting position within the 2D coefficient array, wherein, beginning with the starting position, the first and second sampling patterns separate the 2D coefficient array according to a vertical sampling period and a horizontal sampling period, and the first and second sampling patterns sample different coefficient positions within each vertical and horizontal sampling period;
scan the unsampled coefficient group into a first one-dimensional (1D) coefficient series;
scan the first sampled coefficient group into a second 1D coefficient series; and
scan the second sampled coefficient group into a third 1D coefficient series.

16. A scalable video decoder, comprising:
an electronic memory to store a multiplexed bitstream comprising base layer (BL) video data and enhancement layer (EL) video data; and one or more microprocessor coupled to the electronic memory; the microprocessor to:
derive from first EL video data a first sampled coefficient group that includes first coefficients within a first portion of a coefficient array that is within a sample range and satisfies a first sampling pattern associated with a predefined sampling period, and a predefined sampling phase that specifies the coefficient positions sampled within one sampling period, and excludes second coefficients that are within the first portion but fail to satisfy the first sampling pattern;
derive from second EL video data a second sampled coefficient group that includes at least the second coefficients that satisfy a second sampling pattern associated with the sampling period, and a different sampling phase, and excludes the first coefficients;
derive from the BL video data an unsampled coefficient group that includes coefficients associated with frequencies below those corresponding to the sample range;
assemble the first sampled coefficient group, second sampled coefficient group and the unsampled coefficients into a two-dimensional (2D) coefficient array that represents, at least in part, residue of an SVC compression process, wherein the coefficient array comprises a plurality of consecutive, non-overlapping, groups of coefficients, one or more coefficients located at one or more first coefficient positions within each consecutive group of coefficients is assembled from the first coefficient group, and one or more coefficients located at one or more second coefficient positions within each consecutive group of coefficients is assembled from the second coefficient group; and
perform an inverse transform on the 2D coefficient array, to create a version of the residue.

* * * * *